(12) United States Patent
Gould

(10) Patent No.: US 6,749,932 B1
(45) Date of Patent: Jun. 15, 2004

(54) COLORANTS, COLORED ARTICLES AND METHODS OF MAKING THEM

(76) Inventor: John Gould, 66 Omonde Terrace, London (GB), NW8 7LR ( * ) Notice: Subject to any disclaimer, the term of this patent is extended or adjusted under 35 U.S.C. 154(b) by 0 days.

(21) Appl. No.: 08/652,579

(22) PCT Filed: Dec. 2, 1994

(86) PCT No.: PCT/GB94/02653

§ 371 (c)(1),
(2), (4) Date: Aug. 5, 1996

(87) PCT Pub. No.: WO95/15353

PCT Pub. Date: Jun. 8, 1995

(30) Foreign Application Priority Data

Dec. 3, 1993 (GB) .............................................. 9324809

(51) Int. Cl.⁷ ............................ B32B 5/16; B32B 27/01
(52) U.S. Cl. .................... 428/327; 428/323; 428/297.4; 428/300.4; 264/241; 264/246; 264/445
(58) Field of Search ................................. 428/323, 325, 428/326, 327, 372, 364, 402, 297.4, 300.4; 264/241, 245, 246

(56) References Cited

U.S. PATENT DOCUMENTS

| | | | |
|---|---|---|---|
| RE28,594 E | * 10/1975 | Ronzoni et al. | 260/876 R |
| 4,044,185 A | * 8/1977 | McCaskey, Jr. et al. | 428/153 |
| 4,107,135 A | 8/1978 | Duggins et al. | |
| 4,396,566 A | * 8/1983 | Brinkmann et al. | 264/70 |
| 4,464,513 A | * 8/1984 | Kishida et al. | 525/227 |
| 4,574,065 A | * 3/1986 | Appleyard et al. | 264/76 |
| 4,916,007 A | * 4/1990 | Manning et al. | 428/203 |
| 5,114,779 A | * 5/1992 | Hopperdietzel | 428/144 |
| 5,151,324 A | * 9/1992 | Hanatani et al. | 428/327 |
| 5,418,046 A | * 5/1995 | D'Herbecourt et al. | 428/204 |
| 5,635,266 A | * 6/1997 | Quinn et al. | 428/57 |
| 5,922,257 A | * 7/1999 | Keesling | 264/75 |
| 2002/0055008 A1 | * 5/2002 | Bennett et al. | 428/520 |

FOREIGN PATENT DOCUMENTS

| | | |
|---|---|---|
| EP | 050501 | 4/1982 |
| FR | 2253616 | 7/1975 |
| JP | 49120948 | 11/1974 |
| JP | 860313419 | 7/1988 |
| JP | 1305901 | 12/1989 |
| JP | 3093820 | 4/1991 |
| JP | 4122768 | 4/1992 |
| JP | 5237948 | 9/1993 |

* cited by examiner

Primary Examiner—Cheryl A. Juska
(74) Attorney, Agent, or Firm—Quarles & Brady LLP

(57) ABSTRACT

An article having a decorative visual surface appearance provided by a plastics composition which comprises a transparent or translucent plastics material having a colorant dispersed therein is characterised in that the colorant comprises a blend of discrete polymer particles substantially all of which have a minimum dimension in the range of 5 to 100 micron and a maximum dimension of no more than 10 mm, said particles being of a natural or synthetic organic polymer or a glass, the blend comprising particles of at least two distinct colors and/or shapes, and the plastics composition containing 0.1 to 8 percent by weight of the blend of polymer particles based on the weight of the plastics composition. The article can be made by a method which includes the steps of mixing together the blend and the plastics material or a precursor thereof and forming the article under conditions whereby the polymer particles in the colorant are not deformed to any substantial extent. The colored particles may be provided in a color concentrate homogeneously mixed with a polymer or precursor thereof or a wax. The articles may be moulded, cast, extruded, calendered or reinforced plastics articles, for example floor coverings.

14 Claims, No Drawings

COLORANTS, COLORED ARTICLES AND METHODS OF MAKING THEM

CROSS-REFERENCE TO RELATED APPLICATIONS

STATEMENT REGARDING FEDERALLY SPONSORED RESEARCH OR DEVELOPMENT

Not applicable

BACKGROUND OF THE INVENTION

This invention relates to colourants, including colourants for incorporation in plastics materials, to coloured articles made from plastics materials which incorporate such colourants, and to methods of making such colourants and articles.

Plastics articles made by moulding, casting, extrusion, calendering and suchlike processes are well-known. Such articles may be thermoplastic or thermoset. It is often desirable that the surface of such plastics articles should have a decorative visual effect. Plastics materials which contain colourants such as dyes (i.e. coloured substances dispersed at the molecular level) and/or pigments (i.e. coloured particles up to about 1 micron in size) are well-known. Commonly, such colourants are uniformly dispersed throughout the plastics material, and the plastics material and articles made therefrom are uniformly coloured. Pigment particles scatter light as a consequence of their small size, and as a result pigmented plastics materials are generally opaque. Pure plastics materials are often transparent and remain transparent when dyed. Inert fillers can be included in such dyed materials to provide translucency or opacity. The visual appearance of the surface of such dyed or pigmented plastics materials is generally flat and lacking in depth and texture.

Plastics materials which incorporate particles of visual size (for example, having a minimum dimension of about 5 micron) dispersed therein, for example fibres, flakes or grits (spherical, roughly spherical, or more or less irregular particles), are known. Fibres may be incorporated in a plastics matrix to provide mechanical reinforcement. Grits may be incorporated in a plastics matrix to provide abrasion resistance. If the colour of such particles differs from that of the plastics matrix in which they are incorporated, such plastics materials may have a speckled or mottled appearance, and such particles have on occasion been incorporated for the purpose of providing a decorative surface effect.

BRIEF SUMMARY OF THE INVENTION

The invention provides an article having a decorative visual surface appearance provided by a plastics composition which comprises a transparent or translucent plastics material having a colourant dispersed therein, characterised in that the colourant comprises a blend of discrete polymer particles substantially all of which have a minimum dimension in the range 5 to 100 micron and a maximum dimension of no more than 10 mm, said particles being of a natural or synthetic organic polymer or a glass, the blend comprising particles of at least two distinct colours and/or shapes, and the plastics composition containing 0.1 to 8 per cent by weight of the blend of polymer particles based on the weight of the plastics composition.

It will readily be understood that the term "substantially all" is synonymous with "largely or wholly" or "a substantial majority". For example at least 90 or at least 95 or 100 percent of the particles may be of the specified dimensions.

It will be appreciated that the decorative appearance of the articles of the invention is provided by the colourant within the plastics composition and is independent of any feature of shape or form of the article. The surface of such articles may be smooth, patterned or shaped, but is solid and continuous. It will further be appreciated that the portion of the article which incorporates the colourant may be overlaid by a transparent or translucent layer through which the coloured plastics composition can be seen.

The invention further provides a method of making a plastics article including the steps of:

(a) mixing together (i) a colourant which comprises a blend of discrete polymer particles substantially all of which have a minimum dimension in the range 5 to 100 micron and a maximum dimension of no more than 10 mm, said blend comprising particles of at least two distinct colours and/or shapes, and (ii) a transparent or translucent plastics material or a precursor thereof, and (b) forming said article under conditions whereby said polymer particles are not permanently deformed to any substantial extent.

The invention further provides a colourant in the form of a colour concentrate which comprises discrete coloured particles homogeneously mixed with a polymer or precursor thereof or a wax, characterised in that substantially all of the particles are polymer particles which have a minimum dimension in the range 5 to 100 micron and a maximum dimension of no more than 10 mm, which polymer particles are of at least two distinct colours and/or shapes. The colourant-of the invention may take the form of a masterbatch material wherein the coloured particles are homogeneously mixed with a thermoplastic resin binder.

The decorate surface layer of a plastics article according to the invention has an unusual and attractive dappled appearance with remarkable visual depth and texture. The article surprisingly has this appearance even when, as is desirable, the colourant is well mixed with the plastics material so that it is uniformly dispersed therein. Such a decorative surface layer may if desired be designed to mimic natural materials, for example various types of stone or rock, including sedimentary, igneous and in particular metamorphic rock such as slate. Other examples of such natural materials include leather and wood.

The polymer particles in the colourant may take the form of fibres, flakes, spheroids or grits or mixtures thereof. It may be preferred that substantially all the polymer particles have a maximum dimension in the range 0.5 to 10 mm. Preferred fibres may have a titre in the range 1 to 30 decitex, often 1 to 6 decitex, and a length in the range 0.5 to 10 mm or 0.1 or 0.25 to 10 mm. Such fibres are commonly referred to as staple fibres and may also be referred to as flock, particularly when they have a length below about 5 mm. Fibre flock may be prepared by cutting longer fibres to lengths of about 0.25 mm or above. Shorter flock may be prepared by grinding, for example cryogenic grinding. Preferred flakes may have a basis weight in the range 10 to 50 grams per square meter in the plane of the flake and maximum dimensions in the range 0.5 to 5 mm or 0.1 or 0.25 to 5 mm. Suitable flakes may be prepared for example by chopping or grinding shredding (including cryogenically grinding) a polymer film. Preferred spheroids include polymer beads and glass beads. It will be appreciated that the particles should desirably be of a shape and composition such that they do not damage the processing equipment, for example by abrasion. Accordingly, the use of glass powder or flake may generally be less favoured, as compared with glass fibre and beads, in extrusion and suchlike techniques.

The particles may consist essentially of a natural organic polymer, a synthetic organic polymer or glass. They may consist essentially of a natural polymer which has been processed, for example they may consist essentially of cellulose in the form of regenerated viscose. Use of synthetic organic polymers or processed natural organic polymers may be preferred. Use of glass particles may alternatively be preferred in some applications. Examples of suitable types of glass include A-, C-, E- and S-glass. Each polymer particle usually contains a single type of polymer but may contain a mixture of more than one type of polymer. The particles within the blend may consist of the same or different types of polymer or polymer mixture. The material of the polymer particles should be chosen having regard to compatibility between this material and the plastics material in which the particles are to be incorporated. A specific type of polymer particle is unplasticised cellulose film, optionally pigmented, for example regenerated cellulose film such as that made by the viscose process, which has been reduced to the specified size and optionally dyed.

The polymer particles are preferably both mechanically and thermally stable under the temperatures encountered during processing, in particular plastics processing, so that they substantially retain their original shape and do not degrade during such processing. Deformation of the particles during processing may give rise to a streaky appearance in a plastics article made thereby. The decorative visual surface appearance of the article of the invention may have an isotropic appearance. The polymer particles remain individual and discrete during processing and in the plastics article. The polymer may be a thermoplastic polymer, in which case it will be understood that the processing temperature should be chosen to avoid undesirable deformation of the particles. It has been found that certain thermoplastic polymers, particularly semi-crystalline polymers, may be processed at above their glass transition temperatures without the occurrence of such deformation. Other thermoplastic polymers, particularly amorphous polymers, are preferably processed below their glass transition temperatures. The polymer may be crosslinked and may be thermoset. The polymer may be a polymer which has inherent mechanical stability at temperatures up to the decomposition temperature of the polymer, this decomposition temperature being above the processing temperature of the plastics material. For example, the polymer may be cellulose, particularly regenerated viscose, or an acrylonitrile polymer or copolymer, particularly a copolymer containing at least 85 percent by weight acrylonitrile units. Alternative types of organic polymer which may be used in some applications include polyamides, for example 6:6 and 4:6 polyamides, and polyesters.

The polymer particles are pigmented or dyed to selected colours. Pigments scatter light, and therefore the presence of pigmented polymer particles may reduce the visual depth of the decorative surface layer in an article according to the invention. The blend of polymer particles may include a small proportion of white and/or black pigmented particles, for example matt pigmented fibres, in addition to the particles of distinct colours. Polymers which can readily be dyed to a wide range of intense colours, in particular cellulose and acrylonitrile copolymers, are preferred. Organic polymer particles are available in a wide and precisely controllable range of intense colours, and this is an advantage of the invention. The polymer particles may be pigmented or dyed during their manufacture or may be dyed subsequent to their manufacture. Glass particles are available in a range of colours. The coloured polymer particles preferably exhibit good light fastness.

The polymer particles contained in the colourant blend preferably exhibit a small number of distinct colours, more preferably no more than about twelve, further preferably no more than about six, distinct colours. This allows the production of colourants in a wide range of shades (colours) by appropriate blending of polymer particles from a small range of distinct colours. This leads to simplicity in manufacture, reproducibility and stock control. The term "distinct colours" as used herein means colours of markedly differing hue, that is to say wide radial spacing within a conventional hue circle or colour wheel. Black and white are not considered to be "colours" in the context of the present invention, and accordingly black and/or white particles, if present, are additional to the particles of distinct colours in the colourant.

The blend preferably includes polymer particles of at least two intense colours optionally together with black and/or white particles. The term 'intense colour' as used herein means an intense (saturated) colour preferably located towards the circumference of a conventional hue circle or colour wheel. The at least two intense colours are preferably chosen so that they are widely spaced in such a hue circle. Thus a mixture of various shades of red such as crimson, vermillion, ruby, claret, cherry, carnation and scarlet is not considered to consist of distinct colours in the context of the invention even though they can be distinguished by the naked eye, and even if such colours are intense colours. The points representing the intense colours define a polygonal area within the hue circle, the polygonal area being triangular if three intense colours are used. The colourant of the invention may be prepared in essentially any shade within this polygonal area by blending the polymer particles of the chosen intense colours in suitable proportions. The lightness within a conventional colour cylinder of the colourant of the invention may be varied by altering the proportion of black and/or white particles in the blend. The intense colours may be selected from the group consisting of the primary colours red, yellow and blue. As may be particularly preferred, the intense colours may alternatively be selected from the group consisting of the colours magenta, cyan and yellow, because it has been found that a wide range of shades is achievable using the colours in this group. The blend may comprise polymer particles of more than three intense colours, preferably no more than six intense colours, optionally together with black and/or white particles. This allows the production of a wider range of shades than if only three intense colours are used, because the size of the polygonal area is increased. This also provides flexibility in manufacture, because many shades within the polygonal area can be obtained in more than one way.

A desired shade can be matched by experimental mixing of the polymer particles. It will be understood that the perceived shade of a colourant may differ when viewed on its own and after incorporation in an article. It has generally been found that the perceived shade of a plastics article according to the invention is not necessarily predictable from the colours of the polymer particles by classical colour-mixing theories.

The colours of the polymer particles may be chosen to avoid metameric effects.

The polymer particles contained in the blend may alternatively be of a single colour but of different shapes. For example, the blend may consist of a mixture of fibres and flakes of the same or similar colours. Decorative articles containing such a colourant have a visually attractive appearance different from that of a pigmented article or an article containing only particles all of which are of similar shape.

The blend of polymer particles may additionally compromise colourless polymer particles. This may be advantageous in that it permits the formulation of the colourants of the invention in a wide range of shades, all of which are designed to be incorporated in plastics materials in the same proportions. This leads to simple procedures in the manufacture of the plastics articles of the invention and enables reliable blending of two or more colourants to provide intermediate colours if desired. Such colourless particles may suitably be of the same polymer or polymers as may be used for the coloured particles. Examples of such colourless particles include organic fibres such as viscose and acrylic fibres and glass fibres which contain neither dye nor pigment.

The colourant may additionally comprise small proportions of one or more conventional pigments. Pigments scatter light and therefore if the proportion of pigment is too high the advantageous visual texture and depth provided by the invention may be lost. The proportion of pigment is often preferably no more than about 5 percent by weight based on the weight of the polymer particles, including any pigment present in the polymer particles, although higher proportions, for example in the range 5 to 10 percent, may be desirable in some applications. Addition of pigment may be used to vary the lightness of colour, the colour saturation and the visual texture and depth of the decorative surface of an article incorporating the colourant. A preferred type of pigment is a white pigment such as titanium dioxide. The plastics composition may additionally comprise small proportions of conventional dyes.

The colourant may additionally comprise other particulate materials which provide specific visual effects when incorporated in a plastics article, for example mica flakes, quartz particles, short-cut carbon fibres, opalescent, pearlescent and fluorescent pigments, and metallic pigments.

The colourant of the invention may comprise a, generally thermoplastic, resin binder which serves to bind the polymer particles together, for example in the form of paste or masterbatch granules or pellets. Such paste, granules or pellets are often more convenient to handle, for example during storage, transport and weighing, than blends of the free polymer particles. The binder is preferably readily miscible with the plastics material in which the colourant of the invention is dispersed during plastics processing to form a plastics article. This allows uniform dispersion of the polymer particles throughout the plastics material to be readily achieved. Examples of binders known generally from masterbatch technology include low density polyethylene, ethylene/vinyl acetate copolymers and mineral waxes. Thus, the particles will be dispersed in a polymer or precursor thereof or a wax. The paste, granules or pellets may contain up to about 60 percent by weight polymer particles, often 20 to 60 or 40 to 60 percent by weight. The granules or pellets may additionally comprise small amounts of conventional dyes and/or pigments. These colourants of the invention are useful in the plastics industry and can be subsequently utilised by conventional masterbatch dosing or addition techniques.

The decorative plastics composition in the article aspect of the invention preferably contains 1 to 5 percent by weight of the blend of polymer particles, based on the total weight of the plastics composition including the plastics material. The depth of colour, colour saturation and visual texture of the decorative surface may be varied by altering the concentration of coloured particles and pigment in the material of which it is composed. It has generally been observed that the viscosity of such a composition increases as the concentration of polymer particles is increased. It has also been observed that directional visual effects may be produced in extruded, calendered and suchlike articles as the concentration of polymer particles is increased. It has further been observed that directional effects can be enhanced if the polymer particle blend contains particles of high aspect ratio, for example 20–30 decitex flat fibres, particularly if such particles are dark in colour, for example black.

The polymer particles are preferably uniformly dispersed throughout the plastics material. This can be accomplished by known plastics processing techniques. It may be desirable to treat or coat the particles, for example by applying a suitable finish, to ensure good dispersion and avoid clumping. In the method of the invention the polymer particles may be mixed with a thermoplastic polymer. Alternatively, the particles may be mixed with a polymer precursor, for example a thermoplastic or thermosetting polymer resin, which is subsequently cured to form a polymer.

The plastics material used in the articles of the invention may be translucent or preferably transparent. The refractive index of the polymer particles may be matched more or less closely to that of the plastics material to reduce light scattering. A translucent plastics material may contain a filler, for example it may contain up to about 30 or 50 percent by weight filler based on the total weight of the composition. Such a filler is generally a material, often of relatively small particle size, with refractive index comparable to that of the plastics material. The plastics material preferably contains no pigment or low levels of pigment. A preferred maximum level of pigment (including any pigment in the polymer particles) is 0.1 percent by weight based on the total weight of the plastics composition, although higher levels, for example 0.2 or 0.3 percent or in the range 0.2 to 0.5 percent, may be used in some applications.

Examples of articles of the invention include moulded, cast, extruded and calendered articles. Moulded articles include injection moulded internal and external automotive, aeronautic and marine components, panels, trims, catering ware, houseware such as hair dryers, electric kettles, irons, blenders and mixers, refrigerator and freezer components, vacuum cleaners, floor polishers, brushes, buckets and bowls, cutlery handles, storage containers, picnic ware, suitcases, coathangers, garden furniture, garden tools, wheelbarrows, planters, toys, telephones and suchlike articles. Moulded articles further include vacuum formed articles such as include containers, for example for food and drink, lubricating oil and detergents. Compression moulded articles include electrical plugs and sockets, toilet seats, picnic ware and tableware. Extruded and calendered articles include sheets, films and foils, vinyl upholstery, stationery goods, synthetic security paper, credit cards, floor coverings, including resilient floor coverings, in particular vinyl floor coverings, wall coverings, blinds and awnings, particle board surfacing and extruded profiles. Cast articles include surfboards, boat hulls, service counters and claddings.

The invention also provides a reinforced plastics article comprising reinforcing fibres dispersed in a polymer matrix, the fibres having a minimum dimension (diameter) in the range 5 to 100 micron and a maximum dimension (length) of no more than 10 mm, characterised in that either the reinforcing fibres comprise fibres of two or more distinct colours or the reinforcing fibres comprise fibres of a first colour and the article additionally comprises flake particles of a second colour distinct therefrom, the flake particles having a minimum dimension in the range 5 to 100 micron and a maximum dimension of no more than 10 mm. The reinforcing fibres are preferably of glass, although other types of fibres may also be used. The polymer matrix may be thermoplastic or thermoset. The article generally contains about 10 to 50, preferably 20 to 40, percent by weight reinforcing fibres based on the weight of the article. The article may contain a blend of coloured and uncoloured fibres, in which case it may be preferred that the article contain 0.1 to 8 percent by weight coloured fibres and optional flakes. The coloured reinforcing fibres and optional flakes are preferably of no more than about six distinct colours.

DETAILED DESCRIPTION

The invention is illustrated by the following Examples, in which all parts and proportions are by weight unless otherwise specified:

EXAMPLE 1

Various blends of polymer particles of distinct colours were prepared. The polymer particles used were 3.3 decitex viscose rayon nominal 0.5 mm flock fibre dyed with reactive dyes to intense magenta, cyan, yellow and black shades and regenerated viscose film of basis weight 35 grams per square meter ground into small particles and dyed black. The blends additionally contained between 0 and 20% uncoloured fibre and/or ground film.

A PVC composition consisting of 100 parts PVC resin, 26 parts diisooctyl phthalate, 5 parts epoxidised soya bean oil and 2 parts stabiliser was mixed as powder. 2.5% by weight on the weight of this composition of one of the blends of coloured polymer particles was added and thoroughly mixed into the composition. The PVC composition was fluxed on a 2-roll mill at 160° C. for 5 minutes and extruded between bead-blasted aluminum or siliconised paper at 158° C. and 5515 kPa (800 psi) to form a sheet uniformly 0.1–2 mm, typically 1 mm, thick. The coloured sheets had an attractive dappled and speckled appearance, and were suitable for use as resilient floor coverings.

EXAMPLE 2

Blends of polymer particles were prepared as in Example 1, except that they contained about 3 to 6% mica. A cast was taken from a piece of natural unpolished slate and used to form a mould. 100 parts of conventional polyester moulding resin was thoroughly mixed with 3.5 parts polymer particle blend and the mixture poured into the mould. The resin was cured and the cured article removed from the mould. It had a decorative appearance closely resembling that of natural slate.

EXAMPLE 3

Blends of polymer particles were prepared as described in Example 1. Each blend was thoroughly mixed into a commercial polyester casting resin (3.5 parts polymer particle blend in 100 parts composition) together with a small amount of titanium dioxide dispersion. The resin was cast to form sheets about 3 mm thick. The percentage compositions of the polymer particle blends and the general colour of the sheets are shown in Table 1:

TABLE 1

| Ref. | Yellow Fibre | Magenta Fibre | Cyan Fibre | Black Fibre | Undyed Fibre | Black Film | Undyed Film | Mica | Total Dyed Particles | Colour |
|---|---|---|---|---|---|---|---|---|---|---|
| C21A | 19.9 | 5.1 | 16.4 | 30.1 | 14.4 | 14.0 | | | 55.9 | Grey Green |
| C22A | | | 14.4 | 56.8 | 28.8 | | | | 43.2 | Mid grey |
| C24H | 56.0 | 15.0 | | | 21.5 | 7.5 | | | 92.5 | Greyish pink |
| C25A | 47.6 | 23.6 | | | 28.8 | | | | 100.0 | Pink |
| C26B | 28.8 | 6.8 | 6.8 | 28.8 | 28.8 | | | | 71.2 | Greenish grey |
| C31E | 62.8 | 8.5 | | | 14.3 | 14.3 | | | 85.7 | Yellowish brown |
| C34A | | | 3.4 | 68.5 | 3.4 | 24.7 | | | 6.8 | Light grey |
| C35A | 13.0 | 2.7 | 3.4 | 52.4 | 3.4 | 25.0 | | | 22.6 | Reddish grey |
| C37A | 12.7 | 6.8 | 3.4 | 48.6 | 3.4 | 25.0 | | | 26.4 | Light pink |
| C38E | 19.9 | 2.7 | 3.4 | 45.4 | 3.4 | 25.1 | | | 29.5 | Pale greenish yellow |
| E28C | 9.9 | | | 61.4 | | 28.7 | | | 100.0 | Dark grey |
| E29B | 24.7 | | 3.4 | 42.8 | 0.3 | 28.8 | | | 99.7 | Dark greenish grey |
| E33B | 42.8 | 12.0 | | 16.4 | | 28.8 | | | 100.0 | Dark grey |
| E43E | 16.9 | 2.9 | 0.9 | | | 1.1 | 14.0 | 64.3 | 21.7 | Light sandstone |
| E43G | 50.0 | 8.6 | 2.1 | | | 3.6 | | 35.7 | 64.3 | Dark sandstone |
| H42Q | 47.4 | 23.7 | | 14.3 | | 14.3 | 0.3 | | 99.7 | Red slate |
| H42R | 21.4 | | | 21.4 | | 28.6 | 28.6 | | 71.4 | Green slate |
| H42T | 20.0 | 8.6 | | 42.9 | | 28.6 | | | 100.0 | Black slate |

The amount of titanium dioxide dispersion in 100 parts composition was 0.5 part in the 'C' series of samples, 0.25 part in the 'E' series and 0.06 part in the 'H' series.

The sheets had a speckled appearance due to the inclusion of black ground film. Using a magnifying glass, it was possible to see the individual coloured fibres in the sheets. To the naked eye, the sheets had a visually attractive dappled appearance and texture in which the individual fibres and their colours could not easily be discerned.

Cast were taken from natural pieces of sandstone and slate and used as moulds. Resins containing polymer particle blends shown in Table 1 having a sandstone and slate appearance were then cast in the moulds. The coloured castings had a visual appearance closely resembling that of the natural pieces of stone and could not easily be distinguished from them without close examination.

EXAMPLE 4

PVC sheets were prepared by the method of Example 2 using the following recipes, in which the fibre/film blends are those identified in Table 1 by the given reference codes:

| Light sandstone (York stone) | |
|---|---|
| Plasticised PVC resin | 82.6 |
| Fibre/film blend (E43E) | 1.9 |
| Titanium dioxide | 0.083 |
| Dark sandstone | |
| Plasticised PVC resin | 80.9 |
| Fibre/film blend (E43G) | 2.92 |
| Titanium dioxide | 0.12 |

The sheets closely resembled the types of stone named in the recipes and were suitable for use in resilient floor coverings.

EXAMPLE 5

Masterbatch pellets were prepared by twin-screw compounding at approximately 200° C. (a) 40 parts viscose fibre flock and chopped viscose film (flake) as colourants with (b) 60 parts low-density polyethylene (LDPE) as carrier resin. Dyed flock and flake were used as colourants and were dried at 80° C. before use. The carrier resin had melt flow index 20 g/10 min at 190° C. under 2.16 kg load, measured according to 50 1133 and cond 4/ASMT D 12358, method B, cond E. The pellets contained flock and flake in the following proportions:

| Reference | E33 | E79 |
|---|---|---|
| Yellow fibre | 1.28 | 0.60 |
| Magenta fibre | 0.36 | 0.38 |
| Cyan fibre | 0.00 | 1.55 |
| Black fibre | 0.50 | 0.28 |
| Ecru (unpigmented, undyed) fibre | 0.00 | 0.19 |
| Black flake | 0.86 | 0.00 |

Masterbatch pellets containing 10% titanium dioxide dispersed in LDPE as carrier resin were also prepared. It was found advantageous to dry the viscose-containing masterbatch pellets in an oven before moulding to avoid surface watermarking in the moulded articles.

Specimen bars were prepared by injection moulding blends of these masterbatch pellets with polypropylene and ABS as let-down resins. The maximum proportion of the viscose-containing masterbatch pellets in the blend was 7.5% (corresponding to 3% of fibre and flake in the blend) and of the pigment-containing resin was 1% (corresponding to 0.1% of pigment in the blend). The samples had a visually attractive dappled appearance which was of considerable visual depth. This visual depth was more evident for those samples containing lower proportions of the pigment. The E33-containing samples were grey and the E79-containing samples bluish-green in colour.

Kettle lids were made by injection moulding using the same masterbatch pellets and let-down resins. Polypropylene was moulded using melt temperature 220° C., mould temperature 40–45° C., injection speed 60 mm/sec, injection pressure 1600 bar, holding pressure 30 or 150 bar, holding pressure time 9 sec, cooling time 30 sec and cycle time 55 sec. The blends used for moulding contained 7.5% E33 or E79 pellets and 1 or 2% pigmented pellets. ABS was moulded using melt temperature 250° C., mould temperature in the range 45–75° C., injection speed 90 mm/sec, injection pressure 1600 bar, holding pressure 200 bar, holding pressure time 9 sec, cooling time 30 sec and cycle time 61 sec. The blends used for moulding contained 7.5% E79 pellets and 1% pigment pellets, or 7.5 or 15% E33 pellets and no pigment pellets. The moulded product reproduced the detail in the mould well, including smooth areas, patterned areas and surface lettering.

Utility containers for holding desktop articles and stationery were made by injection moulding with hot runner tooling, using the same masterbatch pellets and polystyrene resin as let-down resin. Moulding was carried out using melt temperature 229 or 239° C., barrel temperature 210 or 220° C., mould temperature 40° C., injection speed 17 or 35 mm/sec, injection pressure 392 bar, holding pressure 40 or 50 bar, holding pressure time 10 sec, cooling time 25 sec and cycle time 44 sec. The blends used for moulding contained 7.5% of E33 or E79 pellets and 0,1 or 2% of pigmented pellets.

What is claimed is:

1. An article provided by a plastics composition which comprises a transparent or translucent thermoplastics material having a colorant uniformly dispersed therein characterized in that the colorant comprises a blend of discrete particles at least 90% of which have a minimum dimension which is from 5 to 100 μm and a maximum dimension of no more than 0.5 mm, said particles being of a natural or synthetic crosslinked thermoplastic organic polymer which is compatible with the thermoplastics material such that the surface of the article is smooth and said particles being mechanically and thermally stable such that they did not degrade during processing that created the article, the blend comprising particles having at least two distinct colors, not black and not white, and the plastics composition containing 0.1 to 8 percent by weight of the blend of said polymer particles based on the weight of the plastics composition.

2. An article according to claim 1, characterized in that the plastics composition contains 1 to 5 percent by weight of the blend of the particles based on the weight of the plastics composition.

3. An article according to claim 1, characterized in the plastics composition contains no more than 0.1 percent by weight of pigment based on the weight of the plastics composition.

4. An article according to claim 1, characterized in that the plastics composition contains no more than 5 percent by weight of pigment based on the weight of the blend of the particles.

5. An article according to claim 1, characterized in that at least some of the particles are spheroids.

6. An article according to claim 1, characterized in that at least some of the particles are fibres.

7. An article according to claim 1, characterized in that at least some of the particles are flakes.

8. An article according to claim 1, characterized in that the blend contains particles of no more than about six distinct colors.

9. An article according to claim 1, characterized in that the blend comprises particles of at least three intense colors, optionally together with black and/or white particles.

10. An article according to claim 9, characterized in that the blend comprises particles of no more than six intense colors, optionally together with black and/or white particles.

11. An article according to claim 1, characterized in that the blend comprises colored particles and colorless particles.

12. An article according to claim 1, characterized in that it is a moulded, cast, extruded or calendered plastics article.

13. An article according to claim 1, wherein at least some of the particles are irregular shaped particles.

14. A method of making an article according to claim 1, characterized in that it includes the steps of:
   (a) mixing together (i) colorant which comprises a blend of discrete particles at least 90% of which have a minimum dimension which is from 5 to 100 µm, and a maximum dimension of no more than 0.5 mm, said particles being of a natural or synthetic cross-linked thermoplastic organic polymer, said blend comprising particles of at least two distinct colors, not black and not white, and (ii) a transparent or translucent thermoplastics rial or a precursor thereof, said particles being present in an amount from 0.1 to 8 percent by weight of the mixture, so that the particles are compatible with and are uniformly dispersed in the thermoplastics material, and the particles are mechanically and thermally stable such that they do not degrade during formation of the article; and
   (b) forming the article under conditions whereby the particles in the colorants are not deformed to any substantial extent.

* * * * *

UNITED STATES PATENT AND TRADEMARK OFFICE
CERTIFICATE OF CORRECTION

PATENT NO. : 6,749,932 B1
DATED : June 15, 2004
INVENTOR(S) : John Gould

It is certified that error appears in the above-identified patent and that said Letters Patent is hereby corrected as shown below:

Column 2,
Line 32, change "colourant-of" to -- colourant of --.

Column 8,
Line 61, change "Cast" to -- Casts --.

Column 12,
Line 2, change "plastics rial" to -- plastics material --.

Signed and Sealed this

Twenty-third Day of November, 2004

JON W. DUDAS
*Director of the United States Patent and Trademark Office*